US006349579B1

(12) United States Patent
Canard

(10) Patent No.: US 6,349,579 B1
(45) Date of Patent: Feb. 26, 2002

(54) STEERING COLUMN ANTI-THEFT DEVICE FOR MOTOR VEHICLE

(75) Inventor: Louis Canard, Nevers (FR)

(73) Assignee: Valeo Securite Habitacle, Creteil (FR)

( * ) Notice: Subject to any disclaimer, the term of this patent is extended or adjusted under 35 U.S.C. 154(b) by 0 days.

(21) Appl. No.: 09/483,861

(22) Filed: Jan. 17, 2000

(30) Foreign Application Priority Data

Jan. 15, 1999 (FR) ............................................. 99 00402

(51) Int. Cl.$^7$ .............................. B60R 25/02; G05G 5/00
(52) U.S. Cl. ............................... 70/186; 70/368; 70/370
(58) Field of Search .......................... 70/182–186, 252, 70/368, 379 R, 380, 367, 369, 370

(56) References Cited

U.S. PATENT DOCUMENTS

| | | | |
|---|---|---|---|
| 2,049,742 A | * 8/1936 | Lowe | 70/46 |
| 2,348,135 A | * 5/1944 | Jacobi | 70/379 |
| 3,410,123 A | * 11/1968 | Jacobi | 70/364 |
| 4,633,689 A | * 1/1987 | Wolniak et al. | 70/379 R |
| 4,689,977 A | * 9/1987 | Wolniak et al. | 70/379 R |
| 5,640,864 A | * 6/1997 | Miyamoto | 70/379 R |
| 5,775,147 A | * 7/1998 | Wittwer | 70/379 R |
| 5,907,963 A | * 6/1999 | Myers et al. | 70/371 |

FOREIGN PATENT DOCUMENTS

EP     0 669 234     8/1995

OTHER PUBLICATIONS

French Search Report dated Oct. 22, 1999.

Patent Abstracts of Japan vol. 1999, No. 01, Jan. 29, 1999 & JP 10 266657A (Honda Lock Mfg Co Ltd), Oct. 6, 1998.

* cited by examiner

Primary Examiner—Lynne H. Browne
Assistant Examiner—John B. Walsh
(74) Attorney, Agent, or Firm—Morgan&Finnegan, LLP

(57) ABSTRACT

The disclosure concerns a vehicle steering column anti-theft device of the type including a casing in which a rotationally mounted lock rotor drives rotationally a rotary projecting part forming a cam that can cooperate with a bolt to control the movements of this bolt, said rotor being of the type in which its cylindrical front end section is engaged in a rear bore of said projecting part and in which said rotor and said projecting part are immobilized rotationally and axially relative to each other, wherein the means of axial immobilization of said projecting part relative to said rotor include a restraining part in the form of a spring clip carried by said projecting part including an elastically deformable section of which one active end projects radially inwards into said rear bore to engage a notch in the peripheral surface of said front end section of said rotor, and wherein, to enable automatic assembly of these parts, the rotor includes means for automatic engagement of said active end of said restraining part in said notch of said rotor.

8 Claims, 5 Drawing Sheets

STEERING COLUMN ANTI-THEFT DEVICE FOR MOTOR VEHICLE

BACKGROUND OF THE INVENTION

The present invention concerns a motor vehicle steering column anti-theft device.

The invention concerns more particularly a steering column anti-theft device of motor vehicle of the type including a casing in which is mounted rotationally a rotor of a lock which drives rotationally a projecting part forming a cam that can cooperate with a bolt to control its movements, of the type in which a cylindrical section of the front end of said rotor fits in a rear bore of said projecting part, and of the type in which said projecting part is linked rotationally to the rotor, these two parts being immobilized axially relative to each other.

DESCRIPTION OF THE PRIOR ART

There are several known examples of this type of anti-theft device which is most commonly used to prevent theft of vehicles, notably private cars.

Numerous perfections have been made to this type of anti-theft device, notably concerning the lock, to improve the strength of the device in response to known techniques used by vehicle thieves.

SUMMARY OF THE INVENTION

The present invention proposes a perfection of the anti-theft device enabling the assembly of the various components in a simple and automated manner.

The invention is therefore a vehicle steering column anti-theft device of the type including a casing in which a rotationally mounted lock rotor drives rotationally a rotary projecting part forming a cam that can cooperate with a bolt to control the movements of this bolt, said rotor being of the type in which its cylindrical front end section is engaged in a rear bore of said projecting part and in which said rotor and said projecting part are immobilized rotationally and axially relative to each other, wherein the means of axial immobilization of said projecting part relative to said rotor include a restraining part in the form of a spring clip carried by said projecting part including an elastically deformable section of which one active end projects radially inwards into said rear bore to engage a notch in the peripheral surface of said front end section of said rotor, and wherein, to enable automatic assembly of these parts, the rotor includes means for automatic engagement of said active end of said restraining part in said notch of said rotor.

According to other characteristics of the invention:

The peripheral cylindrical surface of the front end section of the rotor includes an inclined ramp extending axially rearwards from the front edge of the rotor and radially outwards and cooperates with the active end of the restraining part during axial insertion of the front end section of the rotor into the rear bore of the projecting part;

The ramp is angularly aligned with the notch, and the rotor is connected rotationally to the projecting part by means of the complementary forms which engage each other axially during axial insertion of the front end section of the rotor (16) into the rear bore (34) of the projecting part (20).

The restraining part is a wire part of circular arc shape which is mounted on a circular radial shoulder formed in the peripheral surface of the projecting part and whose active end projects radially through an opening formed in the surface of the shoulder into the rear bore of the projecting part;

The other free end of the wire part is hook-shaped and engages a hole in the surface of the shoulder to hold the wire part in position on the shoulder;

The active end of the wire part is hairpin-shaped and of substantially radial orientation and its intermediate semicircular section (68) projects radially into the rear bore (34) of the projecting part (20) to engage the notch (78) in the rotor.

The free end of the hairpin-shaped active end is hook-shaped to allow it to be manipulated by a tool to pull the active end of the wire part out of the notch of the rotor, thereby enabling separation of the parts;

The projecting part is delimited by a substantially cylindrical peripheral surface that fits rotationally into a corresponding housing in said casing, the casing including an aperture of radial orientation which, at a certain angular position of said rotor relative to said casing, lies opposite the hook-shaped free end of the hairpin-shaped active end of the wire part, providing access for a dismantling tool.

BRIEF DESCRIPTION OF THE DRAWINGS

Other characteristics and advantages of the invention will appear on reading the detailed description below of a preferred embodiment with reference to the attached drawings of which.

DETAILED DESCRIPTION OF A PREFERRED EMBODIMENT

To facilitate the understanding of the description below and of the claims, terms such as "horizontal", "vertical", "upper", "lower" "front", "rear", etc. are used, notably in reference to the figures. However such use is understood to be non-limitative.

Figure 1:
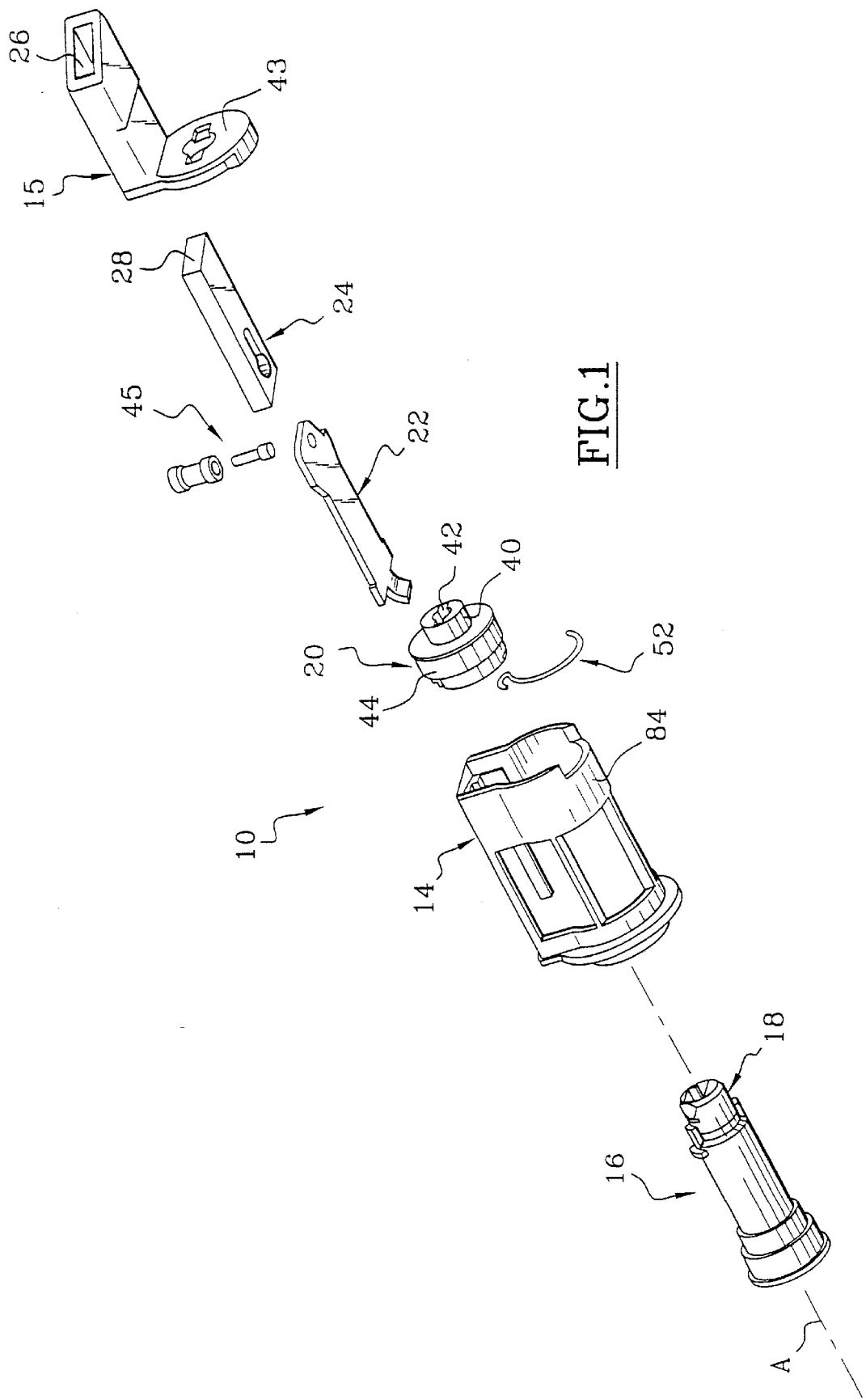
FIG. 1 is an exploded perspective view illustrating the main components of a motor vehicle steering column anti-theft device according to the invention, the view representing the casing of the anti-theft device.

The main components of an embodiment of a motor vehicle anti-theft device 10 according to the invention are shown in FIG. 1.

The device includes a casing 12 in two parts, a rear part 14 and a front part 15.

The rear part 14 receives rotationally, around a longitudinal axis A, a rotor 16 of a lock (not shown in detail) whose cylindrical front end section 18 drives rotationally a projecting part 20 forming a cam that controls the longitudinal sliding movements in both directions along a direction parallel to the axis A of a control bar 22 controlling the movements of a locking bolt 24.

The sliding of the bolt 24 is guided by a guide sleeve 26 formed in the front part 15 of the casing 12 such that the front end 28 of the bolt 24 projects axially beyond the part 15 and inserts into one of the axial splines 30 of a steering column shaft 32 associated with the anti-theft device 10.

The cylindrical front end section 18 of reduced diameter of the rotor 16 drives rotationally in both directions the projecting part 20 which is of substantially cylindrical shape and which has an internal bore 34 at the rear to receive the front end 18 of the rotor 16. The rotational driving of the part 20 by the lock 16 is assured by a lug 38 on the part 18 that axially engages a corresponding notch 36 in the wall of the bore 34.

The rotation of cylindrical rear part 40 of the projecting part 20, of smaller diameter than the main section 44, is guided by a hole 41 formed in the rear of the transversal plate 43 of the front part 16 of the casing 12.

The cylindrical rear part 40 of the projecting part 20 has hole 42 of rotationally asymmetrical shape that serves notably to drive rotationally an electric switch assembly (not shown in the figures) associated with the anti-theft device 10.

The movement of the bolt 24 in both directions is controlled by a cylindrical peg 45 than fits in a longitudinal opening in the rear longitudinal part 49 of the bolt 24.

The bottom of the cylindrical control peg 45 cooperates with a cam 47 on the projecting part 20.

The main section 44 of the projecting part 20, of greatest diameter, is delimited by a cylindrical surface forming a peripheral face 46 delimited axially towards the rear by an annular shoulder 48. This projecting part 20 is extended at the rear by an external cylindrical surface 50 of smaller diameter delimited by the annular rear transversal face 51.

In the cylindrical wall 46 there is a control recess 47 forming a cam that cooperates with the cylindrical control peg 45 in a manner that will not be described here in detail.

According to the invention, to immobilize the lock rotor 16 axially relative to the projecting part 20, a clip 52 retains the cylindrical front end section 18 of the rotor 16 in the bore 34 at the rear of the projecting part 20.

The clip 52 is made of spring steel wire substantially of semicircular shape mounted on the projecting part 20 in a plane more-or-less perpendicular to the axis A.

Figure 4:
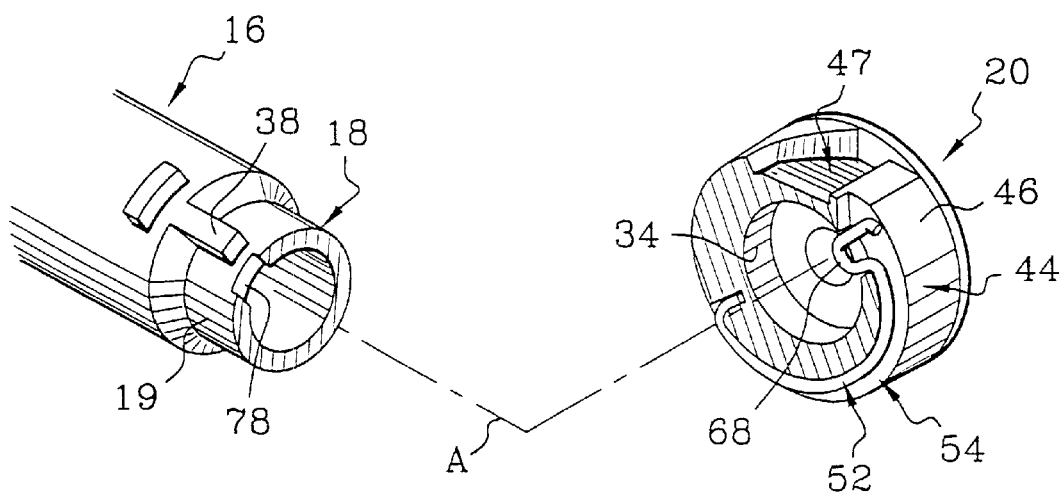
FIG. 4 is a view similar to that of FIG. 3 in which portions of the two parts are cut away in transversal planes passing respectively through the notch of the rotor and the shoulder which receives the spring clip in the projecting part.
Figure 8:
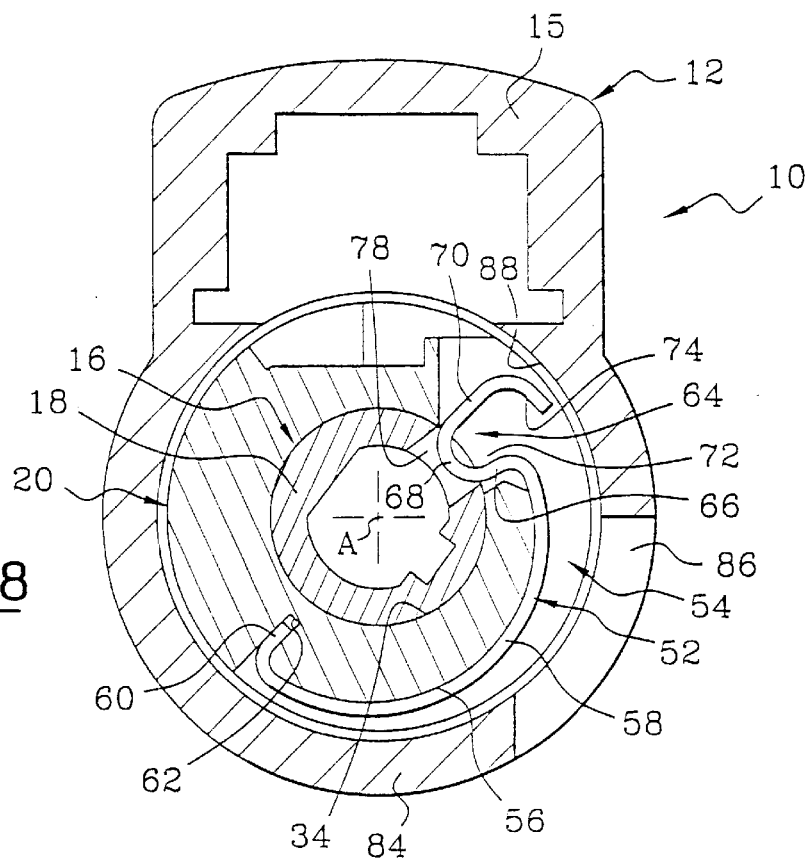
FIG. 8 is a transversal sectional view in a plane passing through the restraining clip and which represents the anti-theft device of FIG. 2 in the locked position corresponding to that of FIG. 2 in which the steering column is locked.

The spring slip 52 is mounted on a circumferential shoulder 54 formed in the cylindrical peripheral face 46 of the front part 44 of largest diameter of the projecting part 20 and extends substantially over one half-circumference (FIGS. 4 and 8).

The shoulder 54 is delimited radially by a substantially cylindrical surface 56 against which, when the clip 52 is fitted and the other components assembled, the body or main section 58 of the clip 52 presses radially inwards.

To hold the clip 52 on the shoulder 54, one free end 60 of the clip 52 is bent radially inwards to form a holding finger that engages a corresponding hole 62 formed in the surface 56 of the shoulder 54 holding the spring clip 52.

The other free end 64 of the clip 52, which constitutes the active end of the clip 52 according to the invention, is bent into the shape of a hairpin of substantially radial orientation.

More precisely, the active end 64 of the clip 52 includes a first section 66 of radial orientation, then an intermediate section 68 in the form of a half-circle connecting the first section 66 to a free end 70 also of radial orientation and substantially parallel to the first section 66.

The active end 64 extends radially inwards and penetrates into the bore 34 of the projecting part 20 via an opening 72 formed in the surface 56 of the shoulder 54 which receives the spring clip 52.

The free end 70 of the hairpin-shaped active free end 64 of the spring clip 52 has a hook-shaped section 74 to allow, as will be explained later, this end to be manipulated by a tool 76 to extract the free end 64 of the clip 52 outside the rear bore 34 of the projecting part 20.

The cylindrical front end section 18 of the rotor 16 of the lock includes, in its peripheral cylindrical surface 19, a notch 78 which extends radially inwards in the direction of the axis A and which is tailored to receive the active end 64 of the spring clip 52, or more precisely its intermediate section 68 in the form of a half-circle, which projects radially into the rear bore 34 of the projecting part 20.

Next to the notch 78 and axially aligned with it, there is a ramp 80 in the peripheral surface 19 of the cylindrical front end section 18 of the rotor 16.

The ramp 80 starts at the free front edge 17 of the section 18 and extends towards the notch 78, inclined from front to rear.

The automatic assembly of the rotor 16 with the projecting part 20 will now be described.

Figure 5:
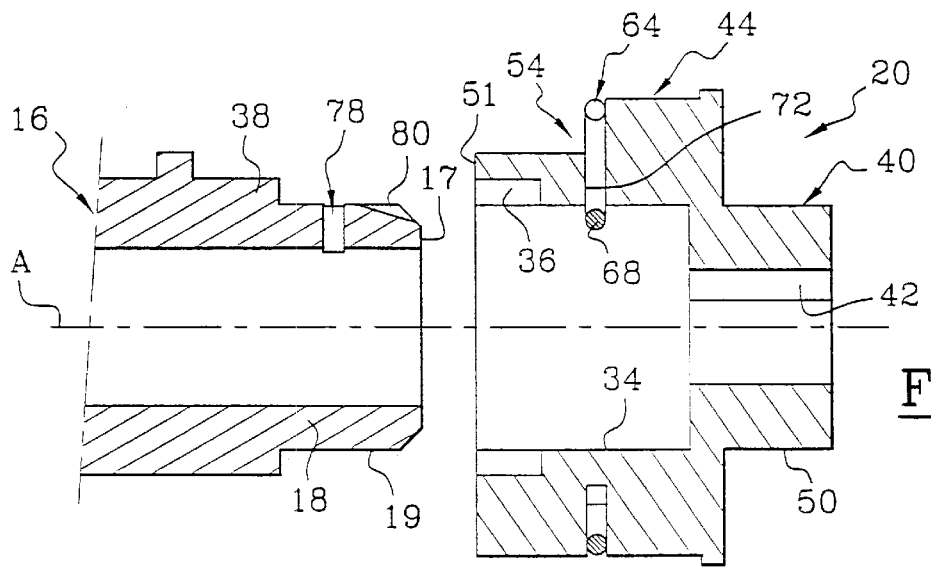
FIGS. 5, 6 and 7 are three large-scale axial sectional views illustrating the cooperation between the various components during assembly of the projecting part on the rotor by axial insertion of the front end of the rotor into the rear bore of the projecting part.

Starting in the configuration shown in FIG. 5, the rotor 16 is placed in an approach position in which its cylindrical front end section 18 is axially aligned with the rear bore 34 of the projecting part 20 and angularly positioned such that the lug 38 is aligned with the notch 36. In this position, the ramp 80 is angularly aligned with the intermediate semicircular section 68 of the active end 64 of the spring clip 52.

Next, the cylindrical front end section 18 is inserted axially (from left to right in FIGS. 5 to 7) into the rear bore 34 of the projecting part 20.

Figure 6:
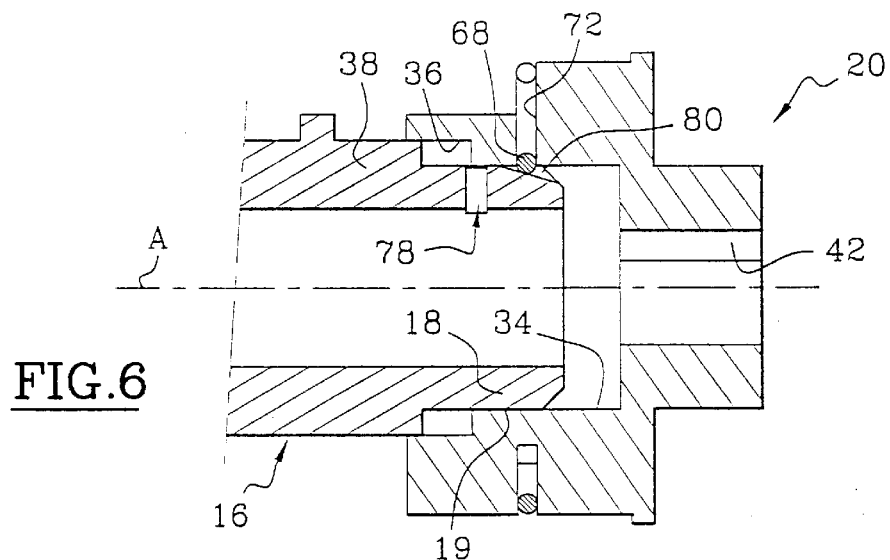

In the intermediate position illustrated in FIG. 6, we see that the ramp 80 pushes radially outwards the intermediate semicircular section 68 of the spring clip 52 in the opening 72. Once the rotor 16 is fully inserted in the rear bore 34 (FIG. 7), the relative axial position of the two parts 16 and 20 is such that the intermediate semicircular section 68 of the clip 52 is aligned with the notch 78.

In this position, the elasticity of the clip 52 ensures that its active end 64 is permanently pushed radially inwards and the intermediate section 68 penetrates automatically into the notch 78 of the rotor 16.

Figure 7:
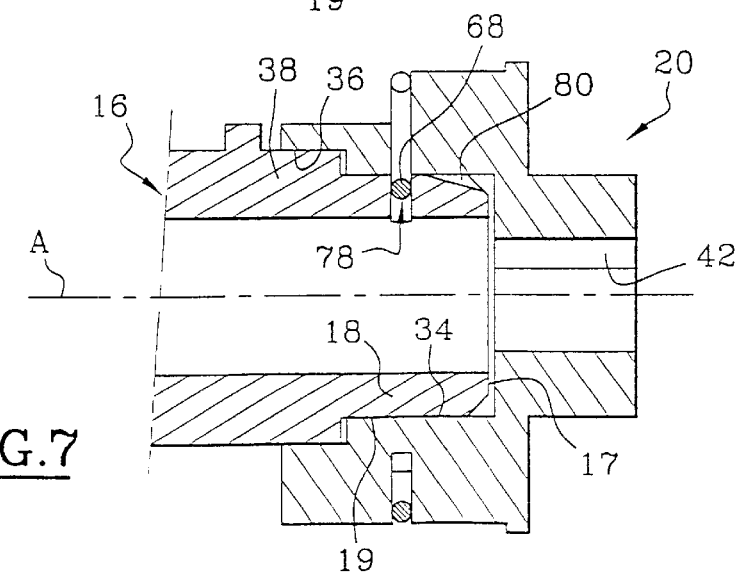

In the position illustrated in FIG. 7, the rotor 16 is therefore immobilized rotationally relative to the projecting part 20 by the lug 38 engaging the notch 36. The rotor 16 cannot be withdrawn from the projecting part 20 owing to the clip 52 engaging the notch 78.

Figure 2:
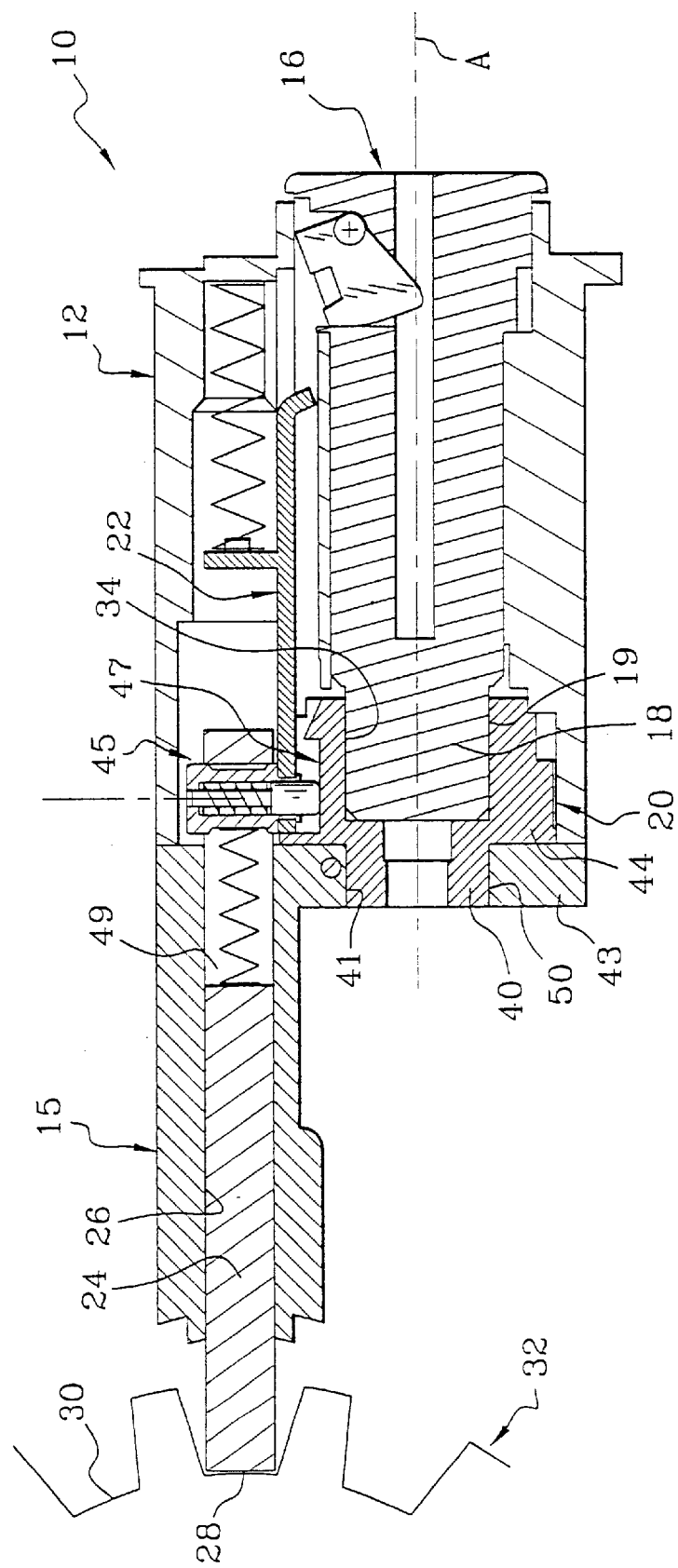
FIG. 2 is a longitudinal sectional view of the main components of an anti-theft device according to the invention with the various components shown in their assembled position.
Figure 3:
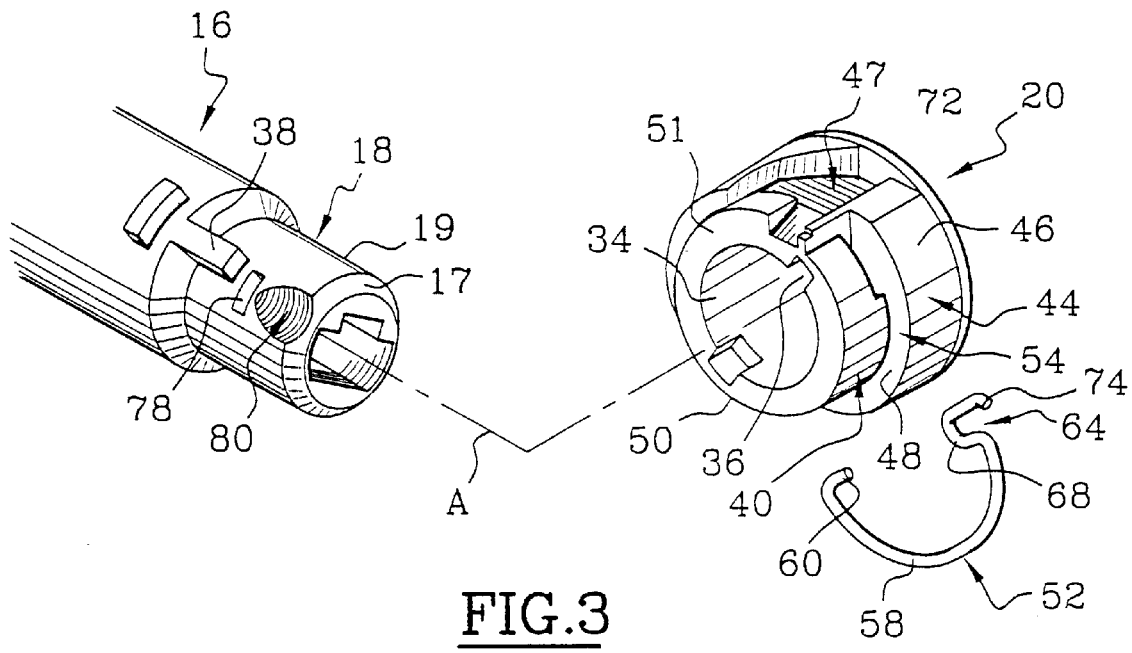
FIG. 3 is an exploded perspective view at larger scale showing the front end of the lock rotor, the projecting part associated with the rotor, and a restraining spring clip assuring axial immobilization between these two parts.

This arrangement enables the assembly of all the components of the anti-theft device illustrated in FIG. 2, finishing with the axial insertion from the rear to the front (from right to left in FIG. 2) of the rotor 16 in the casing 12, after which the rotor 16 is solidly held in the projecting part 20 which can itself be retained axially inside the casing 12. If the clip 52 does not cooperate correctly with the rotor 16, in other words the assembly is not completed correctly, the spring clip 52 projects outwards from the shoulder 54 and thereby prevents rotation of the rotor 16, even with a legitimate key.

To be able to separate the rotor 16 from the projecting part 20, the cylindrical external wall 84 forming the bottom of the rear part 14 of the casing 12 has an aperture 86 which opens radially inwards near the edge of the section of largest diameter 44 of the projecting part 20, and in the mean transversal plane containing the spring clip 52.

As seen in FIG. 8, in the angular locking position of the lock 16 corresponding to the locking position of the anti-theft device illustrated in FIG. 2, the aperture 86 lies opposite the main section 58 of the spring clip 52 and it is impossible to manipulate this section with the aim of extracting the section 68 of the spring clip from the notch 78 because the hook-shaped section 74 of the free end 70 of the active end 64 lies close to an internal wall 88 of the casing 14, 84.

Figure 9:
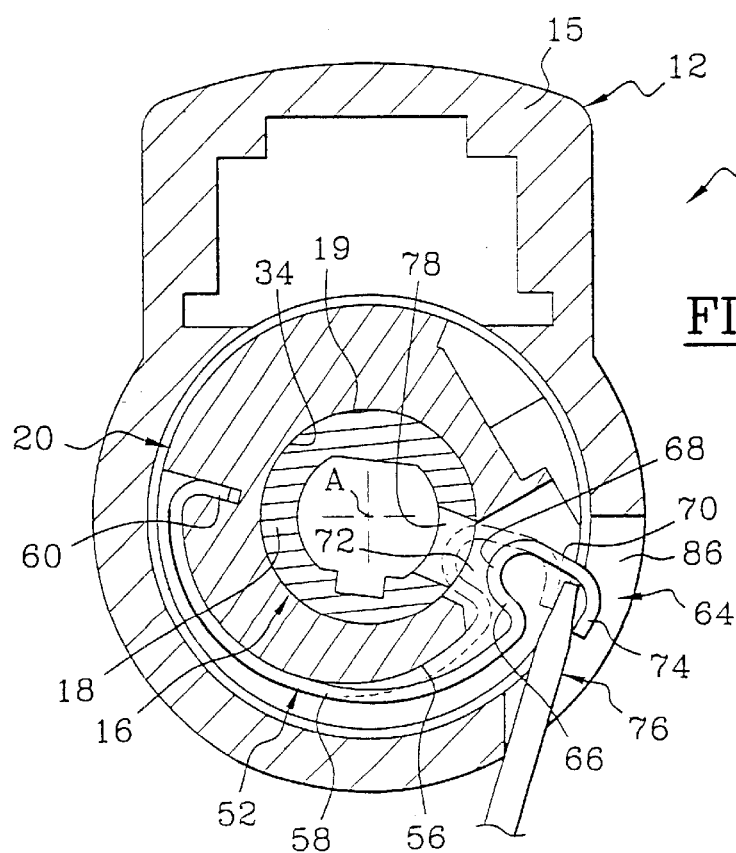
FIG. 9 is a view similar to that of FIG. 8 in which the lock rotor is illustrated in a different angular position, for example in a so-called "accessory" position of the anti-theft device in which it is possible to reach the restraining clip by means of a tool to allow the lock rotor to be separated from the projecting part.

On the other hand, if the rotor 16 is turned around the axis A by using a legitimate key to the angular position shown in FIG. 9, corresponding for example to the "accessories" position of the anti-theft device, the active end 64 of the spring clip finds itself opposite the aperture 86. This allows a tool 76 (for example, a screwdriver, as shown in the figure) to be introduced via the aperture 86 to engage the hook 74 to deform the clip 52 elastically against its own elasticity thereby withdrawing the intermediate semicircular section 68 radially outwards from the notch 78.

In this position illustrated in FIG. 9, it is therefore possible to extract the rotor 16 axially relative to the projecting part 20 since the cylindrical front end section 18 is no longer held axially inside the rear bore 34 of the projecting part 20.

What is claimed is:

1. A motor vehicle steering column anti-theft device comprising a casing in which a rotationally mounted lock rotor drives rotationally a rotary projecting part forming a cam that can cooperate with a bolt to control the movements of this bolt, said rotor having a cylindrical front end section engaged in a rear bore of said projecting part, said rotor and said projecting part being immobilized rotationally and axially relative to each by an immobilization member including a restraining part in the form of a spring clip carried by said projecting part including an elastically deformable section of which one active end projects radially inwards into said rear bore to engage a notch in the peripheral surface of said front end section of said rotor, and wherein to enable automatic assembly of these parts, the rotor includes means for automatic engagement of said active end of said restraining part in said notch of said rotor.

2. An anti-theft device according to claim 1, wherein the peripheral cylindrical surface of said front end section or said rotor includes an inclined ramp extending axially rearwards from the front edge of said rotor and radially outwards and cooperates with said active end of said restraining part during axial insertion of said front end section of said rotor into said rear bore of said projecting part.

3. An anti-theft device according to claim 2, wherein said ramp is angularly aligned with said notch, and wherein said rotor is connected rotationally to said projecting part by means of complementary forms which engage each other axially during axial insertion of said front end section of said rotor into said rear bore of said projecting part.

4. An anti-theft device according to claim 1, wherein said restraining part is a wire part of circular arc shape which is mounted on a circumferential shoulder formed in the peripheral surface of said projecting part and whose said active end projects radially through an opening formed in the surface of said shoulder into said rear bore of said projecting part.

5. An anti-theft device according to claim 4, wherein a free end of said wire part other than said active end is hook-shaped and engages a hole in the surface of said shoulder to hold said wire part in position on said shoulder.

6. An anti-theft device according to claim 4, wherein said active end of said wire part is hairpin-shaped and of substantially radial orientation and whose intermediate semicircular section projects radially into said rear bore of said projecting part to engage said notch in said rotor.

7. An anti-theft device according to claim 6, wherein the free end of said hairpin-shaped active end is hook-shaped to allow it to be manipulated by a tool to pull said active end of said wire part out of said notch of said rotor and thereby enable said front end section of said rotor to be extracted from said rear bore of said projecting part.

8. An anti-theft device according to claim 7, wherein said projecting part is delimited by substantially cylindrical peripheral surface that fits rotationally into a corresponding housing in said casing, and wherein said casing includes an aperture of radial orientation which, at a certain angular position of said rotor relative to said casing, lies opposite said hook-shaped free end of said hairpin-shaped active end, providing access for a dismantling tool.

* * * * *